Dec. 23, 1924. 1,520,132
F. H. JOHNSON
SYSTEM AND MEANS OF CONTROL
Filed Dec. 27, 1919 2 Sheets-Sheet 1
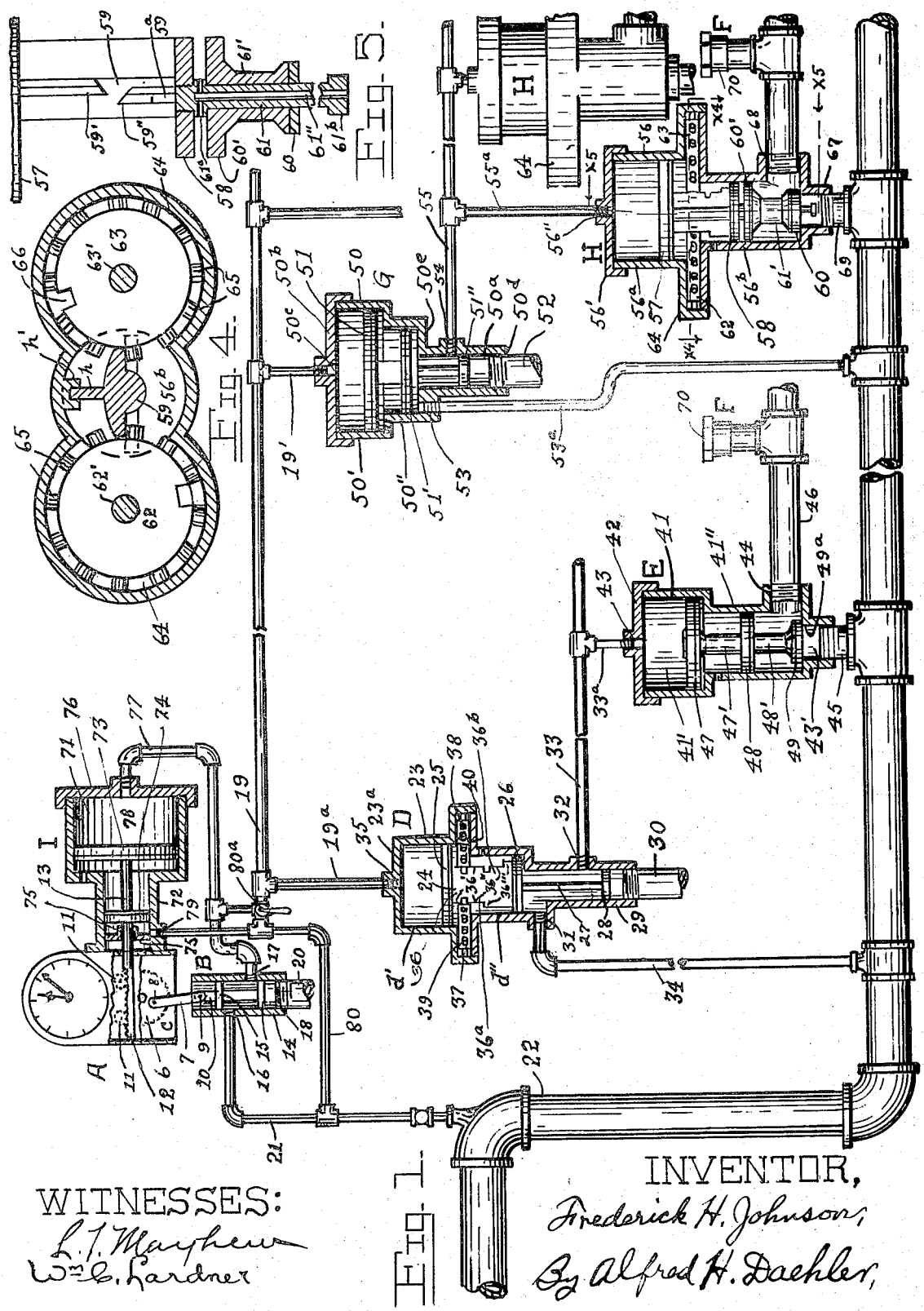
WITNESSES:
L. T. Mayhew
W. C. Lardner
INVENTOR,
Frederick H. Johnson,
By Alfred H. Daehler,
HIS ATTORNEY.

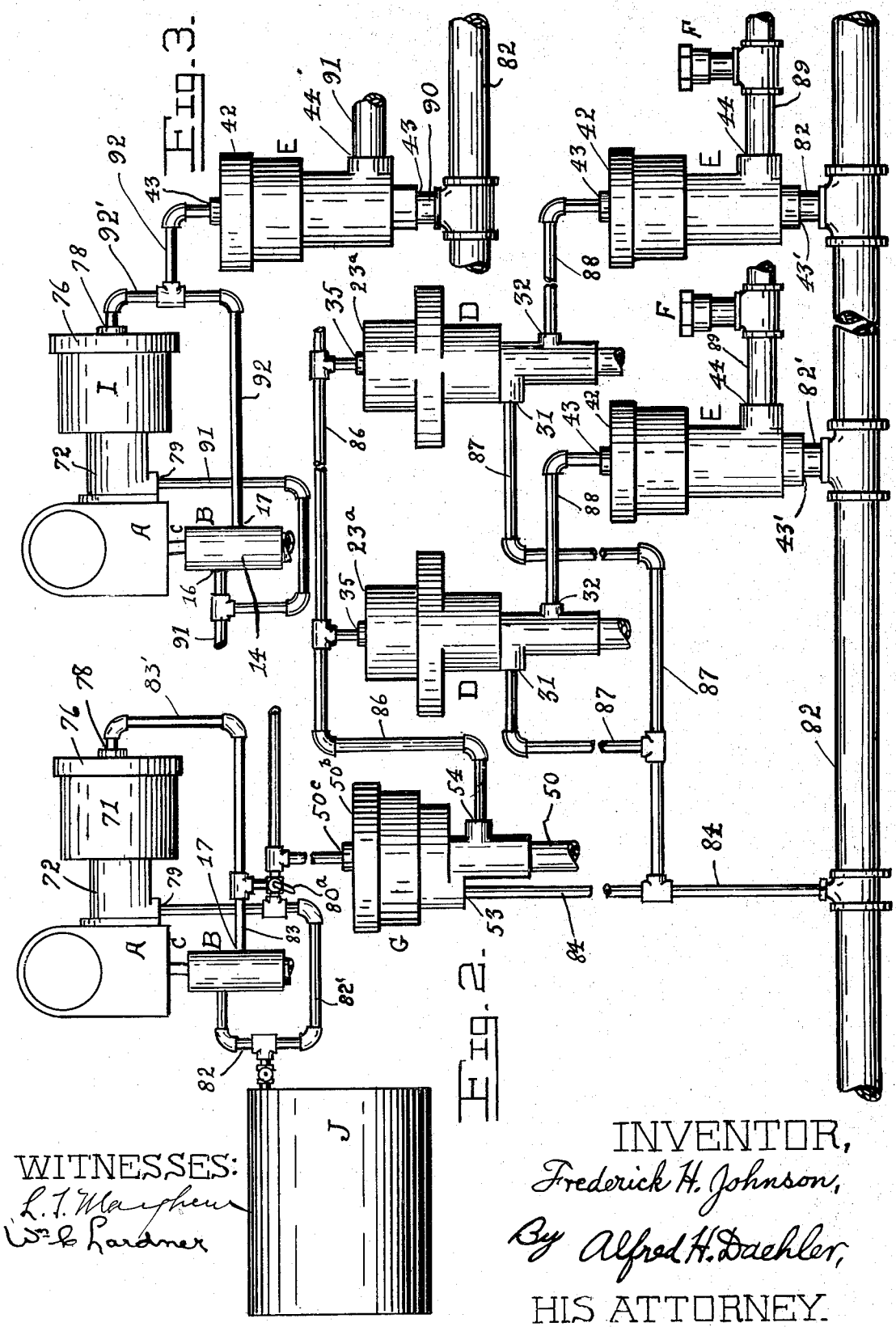

Patented Dec. 23, 1924.

1,520,132

UNITED STATES PATENT OFFICE.

FREDERICK H. JOHNSON, OF SOUTH PASADENA, CALIFORNIA.

SYSTEM AND MEANS OF CONTROL.

Application filed December 27, 1919. Serial No. 347,790.

*To all whom it may concern:*

Be it known that I, FREDERICK H. JOHNSON, a citizen of the United States, residing at South Pasadena, in the county of Los Angeles and State of California, have invented new and useful Improvements in Systems and Means of Control, of which the following is a specification.

This invention relates to systems and means of control and it has for its object to provide improvements of the general character stated applicable to, or adapted for structural incorporation in, a wide variety of means, mechanisms, apparatus and devices, which, or parts of which, are required to function periodically or be energized, actuated, set in motion or otherwise successively influenced in accordance with a predetermined plan involving the proper timing of the controlling influence, with respect to both the starting time and the duration of functioning of each controlled device or feature or period.

The invention has for its further object the provision of improvements in systems and means of control, embracing a plurality of separated functioning devices all responsive to automatic control from a central or single point, which will be superior in point of relative simplicity and inexpensiveness in construction, organization and installation, positiveness and reliability in action, durability and freedom from liability to get out of order, adaptability to the general conditions of service to be performed, and which will be generally superior in efficiency and serviceability.

As my improved system and means of control is particularly useful in the field of hydraulics, as in sprinkling systems, irrigation systems, and the like, where it is desirable to control the discharge or flow of water at a plurality of points, places or stations, successively, subject to control as above outlined, and as the invention and its mode of operation can be well understood thereby, I have herein shown and particularly described sprinkling systems embodying the invention, though it will be understood that the invention may be modified and embodied in systems of other natures, all without departing from the spirit of the invention and the terms of the claims.

With the above and other objects in view, the invention consists in the novel and useful provision, construction, formation, combination and interrelation of parts, members and features, all as hereinafter described, shown in the drawings, and finally pointed out in claims.

Figure 1 is a plan view, partly diagrammatic, and partly broken away and sectioned, of a duplex system and means of control embodying the invention, that is to say, a system one portion of which is shown as connected "in multiple" with another portion of the system, each of such portions in itself illustrating, if separately considered, a system, for clearness of illustration, the preferred forms of the several elements employed by me in the installation of systems adapted to various working conditions are illustrated in this figure as embodied in such " multiple " or duplex system whereby conditions differentiating with respect to pressure in different parts of the system are compensated for, to the end that perfect control, with respect to the time element and duration of activity at each sprinkler may be had;

Figure 2 is a diagrammatic view similar to Figure 1 of a modified system and means of control, slightly differing in its agroupment or interrelation of elements from the duplex system as well as both the portions thereof, shown in Figure 1, though employing certain of the elements shown in Figure 1;

Figure 3 is a diagrammatic view of a still further modified system and means of control, illustrating a simple time controlled system;

Figure 4 is an enlarged horizontal detail sectional view taken on the line $x^4$—$x^4$, Figure 1, and looking in the direction of the appended arrows; and Figure 5 is an enlarged vertical sectional view taken on the line $x^5$—$x^5$, Figure 1, and looking in the direction of the appended arrows.

The parts in the several figures are designated by the same reference characters.

Referring with particularity to the drawing, in the embodiment of the invention shown in Figure 1, in which figure the construction of the several valve and valve-controlling elements is illustrated, A designates time-measuring means, shown as a clock, B designates a master controller, C designates means of connection whereby the master controller B is actuated by mechanism comprised within the time-measuring means A, D designates pilot means, E designates controlling means, F designates, in each instance an operable device, shown as a lawn sprinkler, G designates relay means, H designates, in each instance, controlling means, and I designates operable means employed to rewind the clock.

The time-measuring means A is shown as a clock of the type ordinarily employed for automatically controlling the lighting of electric signs or other devices, means being provided therein for causing or permitting the intermittent actuation of certain elements of the clock at predetermined intervals and holding such actuated elements in their operative position for the predetermined duration of the working period of the device governed by the clock, all as will be readily understood by those skilled in the art; to such means, shown in part as a gear wheel 6, the connecting means C, shown as a connecting rod 7, is eccentrically pivotally connected at its one end as at 8, the other end of the connecting rod 7 being pivotally connected as at 9 to a piston rod 10 comprised within the master controller B. The clock is shown as provided with a pinion 11 at each of its winding points, and teeth on a rack bar 12 formed at one end of a piston rod 13 comprised within the operable means I mesh with the pinions 11, to rewind the clock and reset or restore to normal position the means comprising the gear wheel 6, after each actuation of an operable device comprised within the system, as will be hereinafter described. The gear wheel 6 and pinions 11, are suitably connected, in the conventional manner, as by trains of gearing, with the other clock features which may include the usual movable hands readable in connection with the dial.

The master controller is shown as comprising a cylinder 14 having a pair of spaced pistons 15 fitted therein, the pistons being shown as mounted upon the piston rod 10 the outer end of which is connected, as hereinbefore stated, to mechanism of the clock; a fluid inlet port is provided in the cylinder wall at 16 and fluid outlet ports 17 and 18 are likewise provided in the cylinder, the port 17 being connected by means of a pipe line 19 with other features of the system such as the pilot valve D, the relay means G, and the controlling means H as will hereinafter be described. The port 18 communicates with a drain pipe 20, and the ports being preferably arranged as shown, the fluid under pressure admitted to the cylinder 14 through the port 16 may pass across the cylinder and out through the port 17 and through the pipe line 19, when the pistons 15 are positioned as shown, and when the pistons are moved to the limit of their travel in the direction of the clock, the fluid in the pipe line 19 may flow into the cylinder through the port 17 and out through the drain port 18, the pistons so controlling communication between the pipe line 19 and the parts connected therewith and the inlet and drain ports; by so controlling the ports 16, 17 and 18, pressure medium may be alternately supplied to and relieved in the proper portions of the pilot valve D, the relay means G, and the controlling means H. A pressure medium supply pipe 21 connects the cylinder 14 at its inlet port 16 with a supply water supply conduit or main 22 which is in this figure shown as as the fluid supply means, the fluid of which is controlled as to flow or issue at the plurality of operable devices F, which are shown as lawn sprinklers.

The pilot means D is shown as a valve comprising a casing 23 having differential cylindrical portions $d'$ and $d''$, a differential piston device 24 having a large piston head 25 and a smaller piston head 26 being fitted into the differential casing 23; a piston rod 27 extends from the piston head 26 and carries a small piston head or valve 28 which is fitted into a reduced cylindrical extension 29 of the casing 23. The projecting end of the casing extension 29 is internally threaded to receive a drain pipe 30, and an inlet port 31 and an outlet port 32 are provided in the wall of the cylindrical extension 29, the inlet port being positioned at the base of the extension 29 and the outlet port being positioned between the inlet port and the drain, to the end that communication between a pipe line 33 connected at the port 32, and either the port 31, or the drain 30, may be controlled by the piston valve 28. A pipe 34 connected at the inlet port 31 and with the main 22 supplies fluid under pressure to the space between the piston valve 28 and the piston head 26, and a branch $19^a$ of the pipe line 19 establishes communication with the space between the large piston head 25 and the cylinder or casing head $23^a$, through a port 35 in such casing head $23^a$. The piston heads 25 and 26 are connected by a double edged cam plate 36 the cam edges $36^a$ and $36^b$ of which, respectively, are adapted to rotate blocking or checking plates or discs 37 and 38 in the reciprocation of the cam plate upon piston reciprocation; each blocking or checking plate has a plurality of evenly spaced peripheral teeth 39, and a channel 40 extending inwardly of the periphery of the respective plate and disposed between adjacent teeth; these channels 40 are of the proper width to permit passing of the cam plate edges therethrough, for the full length of the cam plate, when the channels 40 of both the blocking plates or discs are simultaneously in registration with the cam plate. At each of the cam plate edges 36ᵃ and 36ᵇ an upper cam portion 36' and a lower cam portion 36'' is formed, the upper cam portions each acting on a tooth of the respective blocking disc to slightly rotate the discs in the downward travel of the cam plate, and each of the lower cam portions acts on a tooth of the respective blocking disc in the upward travel of the cam plate, the blocking plate 37 being so rotated throughout the distance between adjacent teeth centers upon each excursion or reciprocation of the cam plate and the pistons connected therewith; below each lower cam portion 36'' the cam plate has a lateral abutment 36''' which is adapted to strike the respective blocking disc in the upward movement of the cam plate except when the respective channel 40 is in registration with the cam plate, so to limit the travel of the pistons and their connecting cam plate, excepting at such times as both the channels 40 in the blocking discs are in registration with the cam plate, when the pistons may take a full upward stroke, as both the abutments 36ᵃ provided at the edges of the cam plate may then pass the blocking discs, one of which at other times would obstruct complete movement of the cam plate and its pistons. As a predetermined relation exists between the number of teeth 39 and the number of channels 40, which channels may be plurally provided in the blocking discs, the number of disc rotating or short strokes to each long or full stroke of the pistons may be readily predetermined; for instance, if twelve teeth 39 and one channel 40 are provided in each blocking disc, it follows that out of one hundred and forty four excursions or reciprocations of the pistons and cam plate, only one can be a full length excursion, that is, of piston travel commensurate with cylinder length. When a short stroke of the connected pistons of piston heads 25 and 26 and the piston valve 28 is made, the piston valve 28 travels only a slight distance and remains between the port 32 and the drain 30; and when a full stroke of such piston heads and piston valve 28 is made, the piston valve 28 is temporarily moved to a position between the port 32 and the pressure medium inlet port 31, so controlling the admission of pressure medium to the pipe line 33, and the relieving of the pressure in such pipe line 33 and associated parts.

The cam portions 36' and 36'' and the abutment 36''' for the blocking plate 37 are arranged nearer to the piston head 25 than are the corresponding parts for the blocking plate 38, so that the disc or blocking plate 37 is first actuated in the actuation of the device, and at every piston stroke, while the disc or blocking plate 38 remains stationary until such a number of actuations have been given the blocking plate 37 as are necessary to bring a channel 40 therein into registration with its abutment 36'''; when the parts are in such position, a medium length stroke may be taken by the piston device and the blocking plate 28 actuated by its cam edges, to rotate the same throughout the distance between adjacent teeth centers, after which it must again remain stationary until a channel 40 of the plate 37 is again in registration with its abutment; it will thus be seen that with a plurality of discs or plates 27 and 28 a great number of short and medium length strokes of the piston device to one valve actuation may take place, as a channel 40 in each plate 37 and 38 must be in registration with its respective abutment before the valve 28 can be moved far enough to change the port control thereof by a full stroke of the piston device. If each disc is provided with twelve teeth, and one or more channels 40 cut through each of the plates 27 and 28, it will be found that a great advantage results, in that the given number of stations required to be actuated in any certain installation may be properly taken care of as to proper sequence of performance. During the shortest of the piston strokes, the upper portion of the respective cam edge plays up and down between adjacent teeth of the plate 38, so holding it until a channel in plate 37 comes into registration with its abutment; a guide device such as shown in Figures 4 and 5 may be provided and may comprise a spline $h$ on the differential piston device and a channelled lug $h'$ projecting inwardly of the casing.

The controlling means E is shown as a differential valve device comprising a casing 41 having a large cylindrical portion 41' and a smaller cylindrical portion 41'' communicating therewith. The casing 41 is provided with a cylinder head 42 apertured at 43 to provide a port to which the pipe 33 is connected by a branch 33ᵃ. At the end opposite the cylinder head 42, the casing has a fluid inlet port 43' and a lateral fluid outlet port 44; the port 43 is connected to the main 22 by a pipe 45 and the outlet port 44 is connected by a branch pipe 46 to a sprinkler or a plurality of sprinklers constituting one of the operable devices F. A differential piston device comprising a large piston head 47, a smaller piston head 48, and a disc valve 49, connected so as to form a unit by necks or piston rods 47' and 48', is fitted into the differential cylinder casing 41, with the disc valve 49 in position to be seated at 49ᵃ over the port 43'' to control the flow of fluid from the main therethrough. The surface area of the valve 49 exposed to pressure from the main, when the valve is on its seat may be much smaller than the area of the large piston head 47.

The relay means G is shown as a differential valve having a casing 50 comprising a large cylinder 50', a smaller cylinder 50'', and a cylindrical valve chamber 50$^a$, and a differential piston device comprising a large piston head 51, a smaller piston head 51', and a piston valve 51'' fitted into the casing 50; the casing 50 has a head 50$^b$ apertured to form a port at 50$^c$, and such port 50$^c$ is connected by means of a branch 19' with the pipe line 19 leading from the master controller B. At the end opposite the head 50$^b$ the casing or the valve chamber thereof has an opening or port 50$^d$ in which a drain pipe 52 is fitted. A pressure medium supply port 53 is provided in the offset portion 50$^e$ of the casing 50 at the base of the valve chamber, and a port 54 is provided in the wall of the valve chamber 50$^a$ between the base thereof and the drain opening 50$^d$. The piston valve is adapted to be positioned either between the port 54 and the drain, or between such port 54 and the pressure medium supply port 53, being governed as to position by the position of the master controller B. A pipe line 55 is connected with the valve casing or chamber 50$^a$ at the port 54 and leads through a plurality of branches 55$^a$ to a plurality of the controlling means H, and the casing 50 is connected at its port 53 by means of a pipe 53$^a$ with the main.

Each controlling means H is a differential valve similar to the controlling means E, but having control features equivalent to the blocking or checking discs and cam plate described in connection with the pilot valve D, and comprises a casing 56 providing differential cylinders 56$^a$ and 56$^b$, and a differential piston device consisting of a large piston head 57, a smaller piston head 58 joined thereto by a cam plate 59, and a disc valve 60 of smaller area than either of the piston heads 58 or 57 joined to the piston head 58 by a neck or piston rod 61 upon which the valve 60 and a piston 60' united therewith by a tubular sleeve 61' is slidably mounted. The piston rod 61 has a head 61$^b$ and a central aperture 61'' branched at 61$^a$ so as to permit fluid pressure from the main below the valve 60 to act upon the piston head 58 to urge the same in one direction and act upon the piston 60' to hold the valve to its seat until the controlling pressure upon the piston head 57 is relieved as will be hereinafter explained. This construction provides a slip joint which permits short strokes of the differential piston heads 57 and 58 without lifting the valve from its seat and provides for valve lift at each full stroke of the differential piston heads 57 and 58. The casing 56 has a head 56' in which a port 56'' is provided, the casing 56 being connected at such port 56'' with the pipe line 55 through one of the branches 55$^a$. A plurality of checking discs 62 and 63 are mounted for rotation about shafts 62' and 63', respectively, and are each positioned in the main in a lateral pocket 64, one of which is arranged in the casing at each side and near the top of the smaller cylinder 56$^b$; a segment of each disc, however, projects into the interior of the cylindrical portion 56$^b$ and into the path of the cam plate 59 for actuation thereby, these parts being arranged in substantially the same manner as the equivalent controlling feature of the pilot valve D the checking discs of which are likewise each rotatably mounted upon a shaft and partially housed in pockets in the casing of such pilot valve D. The cam plate 59 has an upper inclined cam 59', a lower inclined cam 59'' and an abutment 59$^a$ just out of the cam zone, at each edge thereof, and each checking disc 62 and 63 has a plurality of preferably round or pin teeth 65 at its periphery and a channel 66 cut into and through the body thereof; this construction is illustrated in detail in Figures 4 and 5, it being understood that these parts in action work substantially as do the equivalent parts in the pilot valve D. At its end opposite the casing or cylinder head 56' the casing has a fluid inlet port 67 and a fluid outlet port 68 and is connected at the inlet port 67 with the main by a pipe 69 and at the outlet port 68 with one or a plurality of sprinklers constituting an operable device.

Each operable device F may consist of a sprinkler head 70 fitted to the end or otherwise connected with the respective branch pipe supplying the same; or as hereinbefore stated, a group of such sprinkler heads may be supplied by each branch pipe, the fluid supplied through such branch pipe being controlled by a controlling means E or a controlling means H, as the case may be.

The operable means I shown as associated with the clock preferably comprises a differential cylinder casing having a large cylinder 71 and a smaller cylinder 72 formed therein, a piston head 73 in the large cylinder, and a piston head 74 in the small cylinder, the pistons being connected for joint movement by the piston rod the clock winding end of which is formed into the hereinbefore mentioned rack bar 12. The small cylinder is closed by a head 75 formed at the clock casing end, the piston rod extending through a suitable stuffing box in the head 75, and the large cylinder is closed at its outer end by a head 76; communication between the pipe line 19 leading from the master controller B is established through a branch pipe 77 which is connected with the large cylinder head at a port 78 therein; the smaller cylinder 72 has a port 79 in the wall thereof between the cylinder head 75 and the smaller piston and is supplied with pressure medium by a branch pipe 80 of the pipe 21 leading from the fluid supply main and connected at the port 79. A three-way valve 80ª interrupts the pipe 19, and is arranged so that fluid may be supplied to the pipe line 19 by either the pipe 80 or through the port 17; when so supplied from pipe 80 the system, with the exception of the means A, controller B, the winding means I is removed from control by the means A; however, the winding of the time measuring means A periodically goes on.

It will be understood that one pilot valve, or one relay valve, may control one or a group or plurality of suitably connected controlling means E, or controlling means H, respectively.

In Figure 2, a system employing suitably interconnected units such as the time measuring means A, the master controller B, the connection means C, pilot valves D, controlling means E, and operable devices F, is illustrated, it being understood that such units are constructed and organized as described in connection with Figure 1, the agroupment and connection scheme of the system now being described, however, being somewhat modified and different from the connection scheme illustrated in Figure 1; futhermore, in this modified system, an auxiliary pressure medium supply is shown, as certain of the units shown are, in this case, arranged to be controlled as to actuation by compressed air from such auxiliary supply, the main portion of the system, however, being hydraulic.

In such modified system one of the relay means units G is interposed between a plurality of pilot valves D and a master controller B and each of such pilot valves D is connected with and controls a controlling means or differential valve E, which in turn controls the passage of fluid from a hydraulic conduit or main 82 to and through a suitably connected operable device F or other outlet. Compressed air is employed to control the relay means D and rewind the clock or time-measuring means A, such air being led through a pipe 82 from the source of supply J to and through the inlet port of the master controller B, where one end of the pipe 82 is connected. A compressed air pipe line 83 leads from the port at 17 to the port at 50ᶜ in the relay casing head 50ᵇ and a branch 83' of the pipe 83 leads to the port at 78 in the head 76 of the cylinder 71 of the means I associated with the clock. A branch 82' of the compressed air supply pipe 82 has its end connected with the port at 79 in the small cylinder 72 of the means I. A three-way valve 80ª such as the valve 80ª hereinbefore described interrupts the pipe 83. The port at 53 in the casing of the relay G is connected by a pipe 84 with the water conduit or main 82, and the port at 54 in such relay casing is connected by means of a suitably branched pipe 86 with the ports 35 in the casing heads 23ª of each of the plurality of pilot valves D employed in the system.

The ports 31 of the pilot valves D are connected with the main 82 by a suitably branched pipe 87 which is shown as connected to the pipe 84, so having an indirect connection with the main 82. At its port 32, each relay valve D is connected, by means of a pipe 88, with the cylinder head 42 of one of the controlling means E, and at the port 43 therein.

Each controlling means E is connected at its inlet port 43' with the main 82 by a pipe 82', and is connected at its port 44 with one or more of the sprinkler heads or devices F by a branch pipe 89.

In Figure 3 I have shown a simple system comprising, one of the differential valves or controlling means units E, suitably connected at its inlet port at 43 with the main 82 by a pipe 90, and having a branch pipe 91 connected therewith at its outlet port at 44, a master controller unit B, a clock or time-measuring unit A and attendant parts, and a winding or operable means I. A pressure medium supply pipe 91 has one of its branches connected with the controller at the port 16 and the other of its branches connected with the small cylinder of the means I at the port 79. A pipe 92 connects the controller at its outlet port 17 with the cylinder head 42 of the controlling means E at the port 43. A branch pipe 92' of the pipe 92 leads to the port 78 in the head 76 of the large cylinder of the means I.

The operation, method of use and advantages of the invention will be readily understood from the foregoing disclosure, taken in connection with the accompanying drawings and the following statement:

In the simple system shown in Figure 3, where the controlling means E is shown as directly connected with the master controller B by the pipe line 92, pressure medium from any suitable source of supply enters the cylinder 14 of the master controller B through the port 16 when the pistons are in the position shown in Figure 1, passes across the cylinder and out through the port 17 into the pipe line 92 and therethrough through the aperture 43 in the cylinder head 42 and into the space between such head 42 and the large piston head 47, so forcing the piston in the direction of the valve seat 49ª and seating the valve 49 to prevent flow from the main through the controlling means E; the valve 49 is held to its seat as long as the master controller pistons remain in this position as the large area of the piston head 47 gives the controlling pressure medium supplied through the master controller B an advantage over the pressure of the fluid in the main which can only act upon the smaller exposed area of valve surface when the valve 49 is seated, and the projected area of valve 49 and the smaller piston head 48 when the valve 49 is in its open position; however, when the master controller piston device is moved to its opposite position or takes a stroke in its cylinder, as by clock-actuation, the pressure in the pipe line 92 is relieved, due to the opening of the drain port 18 of the master controller B being opened to flow from the pipe line 99 and the cutting off of fluid from the pressure supply to such pipe line 92; when the controller pistons are in such position, the pressure of the fluid in the main against the valve 49 and after the opening of the valve, against the piston head 48, overcomes the resistance of the controlling fluid in the pipe line 92 and the fluid in the casing of the controlling means in contact with the large piston head 47 and the piston head 47 forces the controlling fluid out through the pipe line 92, through the port 17 of the controller cylinder, across the cylinder and through the port 18 out through the drain, the valve 49 so lifting and permitting flow of fluid in the main through the controlling means E and out through the lateral outlet port 44 and into the branch pipe connected with the port 44. Upon return of the piston to its original position, as by the clock mechanism, the controlling pressure medium again enters the casing of the controlling means E and forces the valve 49 to its seat, so cutting off further flow from the main. The time of each actuation of the controller pistons, in either direction, being governed by the clock mechanism, the duration of flow from the main as well as the starting time of such flow is automatically controlled.

At each relief or application of pressure in the pipe line 92 by the master controller, the operable means I for winding the clock is affected; when the pressure is relieved, the smaller piston 74 overcomes the resistance to movement of the larger piston 73 and urges the same toward the respective cylinder head, as the pressure of the fluid from the main, through the pipe 80 is behind the smaller piston, and the larger piston expels the fluid in its cylinder between such larger piston and its cylinder head through the port 78, through the pipes 92' and 92, and through the controller B to the drain; when controlling pressure medium is again admitted by the controller B to the pipe 92, such controlling pressure medium acting upon the large surface area of the piston 73, overcomes the resistance of the smaller piston 74 with its smaller surface area exposed to pressure medium, and drives the same in the direction of the clock; in these reciprocations of the pistons 74 and 73, the rack bar 12 is moved to rotate the pinions 11, so to wind the clock as well as reset the controller actuating mechanism thereof, and so render the system self-restoring after the initial winding of the clock.

In the operation of the system shown in Figure 2, the master controller with its supply of compressed air, or other suitable pressure medium controls the reciprocations of the differential piston device of the relay valve in the same general manner that the differential piston device of the controlling means E of the system described in connection with Figure 1 is controlled; that is by admitting controlling pressure medium to the casing 50 through the port 50$^c$ so to drive the piston device in one direction and against the pressure of the fluid in the main upon the effective surface area of the smaller piston 51' and by relieving the controlling pressure, permitting the pressure against the smaller piston to drive the piston device in the opposite direction so expelling controlling medium through intermediate parts and connections and the drain of the controller B. The piston valve 51" is moved in the reciprocation of the piston from one of its positions of adjustment to another position of adjustment and so controls the admission of pressure medium from the main 82, through the pipe 84, port 53, across the valve chamber, out through the port 54, through the branched pipe 86 and through the ports 35 of the pilot valves D to in turn act upon and drive the piston devices therein against the pressure of the main acting upon the exposed sufaces of their respective smaller piston heads 26, such movement being possible due to the larger areas of the large piston heads 25, which areas are exposed to the action of the fluid controlled by the relay valve; the pilot valves each comprising mechanism for limiting or checking certain of the strokes of their respective piston devices and adapted to permit other strokes to be full length or valve adjusting strokes, must each have their piston devices acted upon a definite number of times to make one full stroke, such number being the same number less one, than the number of pilot valves, so that they may perform in sequence, due to prearrangement of their respective checking mechanisms; when the piston valve of the relay is moved to the position permitting communication between the port 54 and the drain, the piston devices of the pilot valves move under the influence of the pressure against the smaller piston heads 26 and overcome the now relieved fluid pressure on the piston head 25, relieved fluid being discharged through the pipe 86, through the relay valve, and out through the drain port 50ª thereof.

Each pilot valve D controls the flow of fluid from the main, through the pipe 87 connected at its port 31, through its valve chamber, through its port 32, into and through the respective pipe 88, and through the port 43 of the respective controlling means E and into the large cylinder thereof, and the reverse flow out through the drain 30, so controlling, by means of the piston valve 28, the reciprocations of the piston device of the respective controlling means E, which is urged in one direction by fluid pressure admitted by the respective pilot valve and applied to its piston head 47, and in the other direction by pressure in the main, when the pilot valve relieves the pressure on its piston head 47; when the piston device lifts the valve 49, fluid from the main flows through the respective controlling means, out through the respective branch 89 and sprinkler 70.

It will be understood that while compressed air is mentioned as a controlling fluid, hydraulic or other pressure medium may be employed as an auxiliary to the body of fluid in the main in the operation of the system.

The system shown in Figure 1 is controlled by the positioning of the master controller pistons, in substantially the general manner described in connection with the Figures 2 and 3, the pilot valves D and the relay valves G responding directly to the influence of the controller B in its admission of fluid pressure from the main 22 to the pipe line 19 and the relieving of the pressure in such pipe line 19, the controlling means units E connected with each pilot valve responding to the application and relief of controlling pressure through its connecting pipes 21 and 21' and controlling the flow from the main through the respective branch pipe 46 and sprinkler 70; the controlling means units H connected with the relay respond to movements of its piston valve in admitting pressure medium to the pipes 55 and 55ª leading thereto from the relay valve chamber, and in permitting the discharge of such pressure medium from the pipes 55 and 55ª and the casings 55, but each acts only in proper sequence with respect to the others and with respect to the pilot-controlled controlling means units E, in permitting flow from the main through its respective branch 69 and sprinkler 70, by a full stroke of the piston heads 57 and 58 in valve-lifting action.

A great advantage attendant upon the use of the relay means D is that the pressure in the main is not forced to lift a high column of liquid or work directly against the resistance to fluid flow in the controlling pipe line 19 leading from the master controller B, by pressure against the valve 60, as the column of fluid directly opposing valve lifting may be discharged through the relay valve chamber, the piston device of the relay working against the fluid in the pipe 19.

The checking means discs may each be provided with any number of teeth and the channels in each disc may be plurally provided so as to adapt each checking mechanism for co-action with any number of other checking mechanisms in the system, and one more disc may be provided in each mechanism, all according to the number of control stations.

Having thus disclosed my invention, I claim and desire to secure by Letters Patent:

1. A system and means of control, comprising time-measuring means, a controller governed by said time-measuring means, controlling means directly controlling the functioning of the system and responsive to the actuation of said controller, and means responsive to the actuation of said controller and facilitating controlling means actuation in the operation of the system.

2. A system and means of control, comprising time-measuring means, a controller governed by said time-measuring pilot means, controlling means directly controlling the functioning of the system and responsive to the actuation of said controller, and means responsive to the actuation of said controller and facilitating controlling means actuation in the operation of the system.

3. A system and means of control, comprising a master controller, a plurality of controlling means units responsive to the controller in the actuation thereof, pilot means responsive to the controller in the actuation thereof and facilitating actuation of one of said controlling means units, and relay means responsive to the controller in the actuation thereof and facilitating actuation of another of said controlling means units.

4. A system and means of control, comprising a master controller, a plurality of controlling means units responsive to the controller in the actuation thereof, pilot means responsive to the controller in the actuation thereof and facilitating actuation of one of said controlling means units, relay means responsive to the controller in the actuation thereof and facilitating actuation of another of said controlling means units, time-measuring means for governing the actuation of said master controller and including controller actuating means, and means of operative connection between said actuating means and said master controller.

5. A system and means of control, comprising a master controller, a plurality of controlling means units responsive to the controller in the actuation thereof, pilot means responsive to the controller in the actuation thereof and facilitating actuation of one of said controlling means units, and relay means responsive to the controller in the actuation thereof and facilitating actuation of another of said controlling means units; there being time-measuring means adapted to regulate the actuation of the master controller to the end that controlling means units may be successively actuated to cause the successive functioning of parts of the system and the duration of functioning of each such system part predetermined.

6. A fluid system and means of control, comprising a master controller, time-measuring means for actuating and governing said controller including means for predetermining the time of controller actuation, means for supplying a pressure fluid to said controller, a plurality of controlling elements successively responsive to controller actuation and each including mechanism for determining the sequence of its own operation, and the several said mechanism being pre-adjusted each with respect to the other or others operating in conjunction therewith, and a fluid pressure conduit leading from said master controller to said elements.

7. A fluid system and means of control, comprising a master controller, time-measuring means for actuating and governing said controller including means for predetermining the time of controller actuation, means for supplying a pressure fluid to said controller, a plurality of controlling elements successively responsive to controller actuation and each including mechanism for determining the sequence of its own operation, and the several said mechanisms being pre-adjusted each with respect to the other or others operating in conjunction therewith, and a fluid pressure conduit leading from said master controller to said elements; there being a fluid controlling means associated with and controlled by each of said elements, and a connection conduit between each fluid controlling means and the respective element.

8. A hydraulic system and means of control, comprising a time-governed master controller, and a plurality of valves connected therewith; each of said valves comprising mechanism adjusted for co-action with the like mechanism of the others of said valves and whereby all of said valves may be influenced upon each controller actuation but are restrained from functioning as valves except in sequence.

9. A hydraulic system and means of control, comprising a time-governed master controller, and a plurality of valves connected therewith; each of said valves comprising mechanism adjusted for co-action with the like mechanism of the others of said valves and whereby all of said valves may be influenced upon each controller actuation but are restrained from functioning as valves except in sequence; each said mechanism comprising checking means for so restraining valve functioning, and means for moving the checking means each time the valve is influenced so to control the valve to permit its functioning only in proper sequence.

10. In a hydraulic system, time measuring means, a plurality of controlled devices for controlling the flow of fluid, means periodically actuated by said time measuring means for controlling the operation of said fluid controlling devices in sequence, and means for facilitating the actuation of said controlled devices.

11. In a hydraulic system and means of control, a plurality of controlled devices for controlling the flow of fluid, a controller for controlling the operation of said devices, means interposed between said controller and said devices for further controlling the actuation of said devices, and means for actuating said controller.

In testimony whereof, I have signed my name to this specification in the presence of two subscribing witnesses.

FREDERICK H. JOHNSON.

Witnesses:
ALFRED H. DAEHLER,
FRANCIS ISGRIGG.